United States Patent [19]

Watanabe et al.

[11] 4,368,414
[45] Jan. 11, 1983

[54] PULSE MOTOR DRIVING DEVICE OF SEWING MACHINES

[75] Inventors: Kazuo Watanabe, Hachioji; Hahiro Makabe, Fussa, both of Japan

[73] Assignee: Janome Sewing Machine Co., Ltd., Tokyo, Japan

[21] Appl. No.: 110,850

[22] Filed: Jan. 10, 1980

Related U.S. Application Data

[63] Continuation of Ser. No. 925,467, Jul. 17, 1978, abandoned.

[30] Foreign Application Priority Data

Jul. 20, 1977 [JP] Japan .................................. 52-86895
Nov. 25, 1977 [JP] Japan .................................. 52-140743

[51] Int. Cl.$^3$ ............................................. H02P 5/00
[52] U.S. Cl. ..................................... 318/696; 318/599
[58] Field of Search ................ 318/696, 681, 599, 341

[56] References Cited

U.S. PATENT DOCUMENTS

| | | | |
|---|---|---|---|
| 3,260,912 | 7/1966 | Gregory | 318/599 |
| 3,427,520 | 2/1969 | Oppendahl | 318/599 |
| 3,560,829 | 2/1971 | Brennan | 318/599 |
| 3,812,413 | 5/1974 | Keidl | 318/696 |
| 3,824,440 | 7/1974 | McIntosh | 318/696 |
| 3,826,966 | 7/1974 | Nagasaka et al. | 318/696 |
| 4,006,391 | 2/1977 | Deering et al. | 318/341 |
| 4,229,685 | 10/1980 | Meier | 318/696 |

Primary Examiner—J. V. Truhe
Assistant Examiner—Richard M. Moose
Attorney, Agent, or Firm—Michael J. Striker

[57] ABSTRACT

A pulse motor driving device for a pulse motor having a plurality of windings. A first plurality of switching elements is connected to a first pole of a D-C power supply and to a connecting means for providing a connection to the windings of the pulse motor and to a second plurality of switching elements. The second pole of the D-C power supply is connected to the second plurality of switching elements. A plurality of diodes is connected to the connection means and to one of the poles of the D-C power supply. A capacitor is connected between one of the plurality of switching means and the D-C power supply. A comparison signal generator can be connected to the first plurality of switching elements, a reference voltage generator can be connected to the comparison signal generator and current detectors can be connected between the second plurality of switching elements and the D-C power supply.

1 Claim, 28 Drawing Figures

FIG_1

FIG_2

FIG_6

FIG_11

PULSE MOTOR DRIVING DEVICE OF SEWING MACHINES

This is a continuation, of application Ser. No. 925,467, filed July 17, 1978, now abandoned.

OUTLINE OF THE INVENTION

This invention is concerned with a pulse motor driving device used for controlling amounts of needle movement and cloth feeding, designed in small size for improving its control characteristic.

BRIEF SUMMARY OF THE INVENTION

The pulse motor driving device disclosed in this invention has been designed to eliminate unnecessary power consumption by a simple improvement, thus providing a powerful motor driving force.

For pulse motor driving power supply, such methods are so far available as that for improving a response of a motor at the starting time with its time constant reduced, resistors are inserted in series and the supply voltage increased in order for compensating the voltage drop resulted from insertion of the resistors or that for increasing voltage applied to a motor, thus improving its starting characteristic through the adoption of a construction which improves operating characteristic of a motor during running by means of a constant current circuit with transistors inserted into the motor in series and reduces voltage drop at time of current build-up during the motor starting by means of characteristic of the inserted transistors.

However, these methods will accompany unnecessary power consumption by resistors and transistors as well as heat generation resulted from the said unnecessary power consumption. As the result, the size of associated devices needed for power supply and heat radiation generally becomes large and it also becomes difficult to house these devices in narrow limited space inside a sewing machine.

Further, for rapidly actuating a pulse motor a method is also available, which accelerates the build-up of winding current by setting the supply voltage to windings at relatively high level and then, reducing it. This method, however, has such disadvantages that a large power supply is required or power consumption by a voltage reducing device increases or a device involved becomes complicated in structure or large in size.

In addition, there are also such methods available as that for improving a response for current switching at the time of winding current interruption by rapidly reducing the induced voltage of winding to zero, which is generally generated when current is interrupted or that for forming a shorted circuit for consuming electromagnetic energy of windings by using varisters in order for protecting semiconductors used for winding current switching from being affected by the induced voltage. These methods, however, bring about unnecessary power consumption, require a means for heat radiation or too large size of device, and neither of them has good practicality.

This invention has been studied and invented in order to eliminate the disadvantages and defects of traditional motor driving devices as mentioned above. That is, the basic purpose of this invention is to make the driving circuit small in size to allow easy installation in a limited space available inside a sewing machine.

The second purpose of this invention is to eliminate the unnecessary power consumption in the circuit as well as to minimize the quantity of heat generation, thus improving controlability of the pulse motor.

The third purpose of this invention is to make it possible to operate the pulse motor at high speed by improving transient characteristic of winding current at multiple number of windings of the pulse motor when the winding current is switched.

Many other outstanding features and definite effects on the operation of the pulse motor that can be derived from this invention are further explained by using examples in the following.

BRIEF DESCRIPTION OF THE SEVERAL VIEWS OF THE DIAGRAMS

The attached diagrams illustrate definite embodiments of this invention.

DETAILED DESCRIPTION OF THE INVENTION

Figure 1:
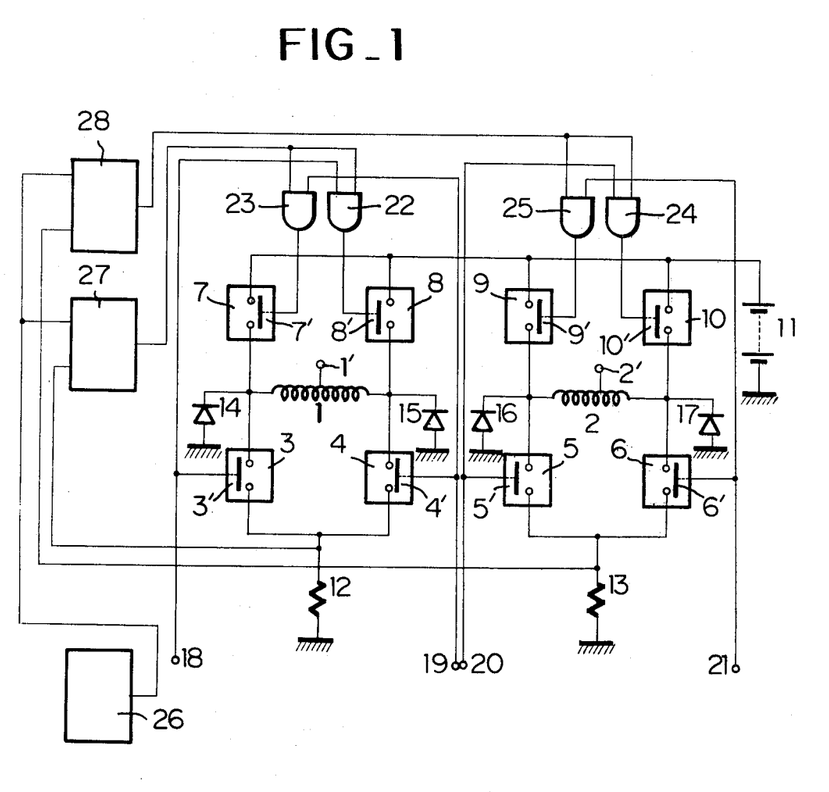
FIG. 1 is the basic structural circuit diagram of the driving device of this invention.

This invention is explained in detail with reference to the said attached diagrams in the following. (1) and (2) in FIG. 1 are windings of a generally used four-phase pulse motor, arranged with a 90° phase angle between them, and intermediate taps (1') and (2'), which are normally to be used, are not employed in this case. (3)-(6) and (7)-(10) are switching elements which make and break current on the windings (1) and (2) or change the direction of current by a combination of their open and close actions as described later. (11) is a DC power supply for the said windings, (12) and (13) are resistors for detecting current of the said windings.

The said switches (7)-(10) open or close at high speed at 20 kHz as described later during the switches (3)-(6) are kept closed, diodes (14)-(17) constitute a circuit for electromagnetic energy release current accumulated in the windings (1) and (2) during the open period of the high speed open or close actions of the said switches (7)-(10) and functions for smoothing the winding current. (18)-(21) are driving signal input terminals, and the set of the said terminals receives four-bit binary driving signals generated from a pattern signal generating device (not shown in the diagram). The said terminals (18)-(21) are connected to the contacts (3')-(6') of the said switches (3)-(6) and to one side input terminals of "and" circuits (22)-(25), respectively. When the "and" value of a set of terminals is 1, the switches (3)-(6) connected to those terminals are closed. In the similar manner, another inputs of the "and" circuits (22)–(25) are made effective as described later. (26) is a 20 KHz triangular wave signal generator, and (27) and (28) are chopping signal generators each of which forms a pair with the winding (1) and (2), respectively. These chopping signal generators convert the triangular wave signal generated from the said triangular wave signal generator into a comparison reference voltage, and after receiving voltage from the said current detecting resistors (12) and (13), compare both to determine pulse width that means "and" value 1 for every triangular wave. This signal is then the input into the other side input terminals of said "and" circuits (22)–(25). Output from each of the said "and" circuits is connected to the contacts (7')–(10') of the said switches (7)–(10), and when the output from the said "and" circuits is 1, the switches (7)–(10) connected thereto are closed.

Figure 2:
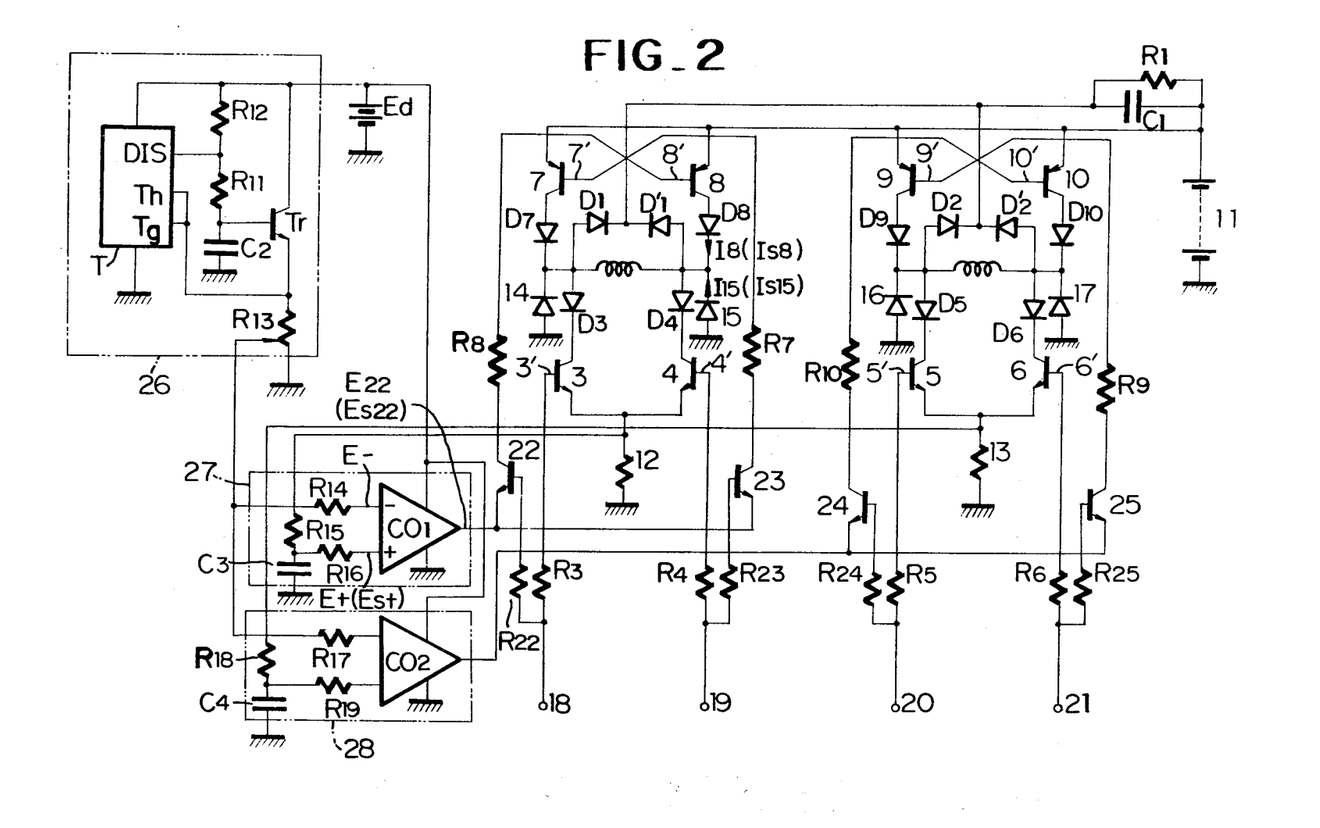
FIG. 2 is the definite circuit diagram of the said basic structural circuit diagram.

FIG. 2 illustrates a definite example of the basic structural diagram shown in FIG. 1. Transistors (3)–(10) and their bases (3')–(10') are equivalent to the said switches (3)–(10) and contacts (3')–(10'). Transistors (22)–(25) are equivalent to the said "and" circuits (22)–(25). When the transistors (3)–(6) become inoperative and the current to the windings (1), (2) is interrupted, diodes $(D_1)$ $(D_1')$ $(D_2)$ $(D_2')$, resistor $(R_1)$ and capacitor $(C_1)$ comprise a power consumption circuit through a power supply (11) and diodes (14)–(17) to absorb the electromagnetic energy accumulated in the said windings, thus protecting the said transistors (3)–(6). Diodes $(D_7)$–$(D_{10})$ protect the transistors (7)–(10) when the said current is interrupted. Diodes $(D_3)$–$(D_6)$ are for preventing power loss of the transistors (3)–(6) resulted from change in current at the windings (1) and (2). $(R_3)$–$(R_{10})$ and $(R_{22})$–$(R_{25})$ are resistors used for limiting the base current of the transistors (3)–(10) and (22)–(25). The triangular wave signal generator (26) has a capacitor $(C_2)$ which is connected to a discharging terminal (DIS) of a timer (T), which is generally known as a name of 555 by way of resistor $(R_{11})$, and is also connected to a DC power supply (Ed) by way of resistor $(R_{12})$. When the capacitor $(C_2)$ is charged at a time constant that is determined together with the resistors $(R_{12})$ and $(R_{11})$, a transistor (Tr) senses this charging voltage and gives a signal to the input terminals (Th) and (Tg) of the timer (T). This signal reduces the potential at the discharging terminal (DIS) to zero to discharge the capacitor $(C_2)$ at a specific constant that is determined together with the resistor $(R_{11})$. The voltage at the capacitor $(C_2)$ thus forms a triangular wave form. The chopping signal generators (27) and (28) primarily consist of capacitors $(CO_1)$ and $(CO_2)$. This is further explained in the following by taking the generator (27) only as an example. Triangular wave voltage of the said capacitor $(C_2)$ is taken out of a proportionally adjustable resistor $(R_{13})$ and is applied to the inversion input terminal (−) by way of a resistor $(R_{14})$. On the other hand, a pulsating current is flowing through the winding (1) as described later, and the voltage of the current detecting resistor (12) of the winding (1) is being received by the non-inversion input terminal (+) by way of a resistor $(R_{16})$ and a low-pass filter which is consisting of the resistor $(R_{16})$ and a condenser $(C_3)$. This output is connected to the emitter of the transistors (22) and (23). Similarly to the signal generator (27), the chopping signal generator (28) has a condenser $(C_4)$ and resistors $(R_{17})$, $(R_{18})$ and $(R_{19})$ at the input side of the comparator $(CO_2)$. Output from this generator is connected to the emitters of transistors (24) and (25). The said power supply (Ed) also serves as a power supply to the comparators $(CO_1)$ and $(CO_2)$.

Figure 3:
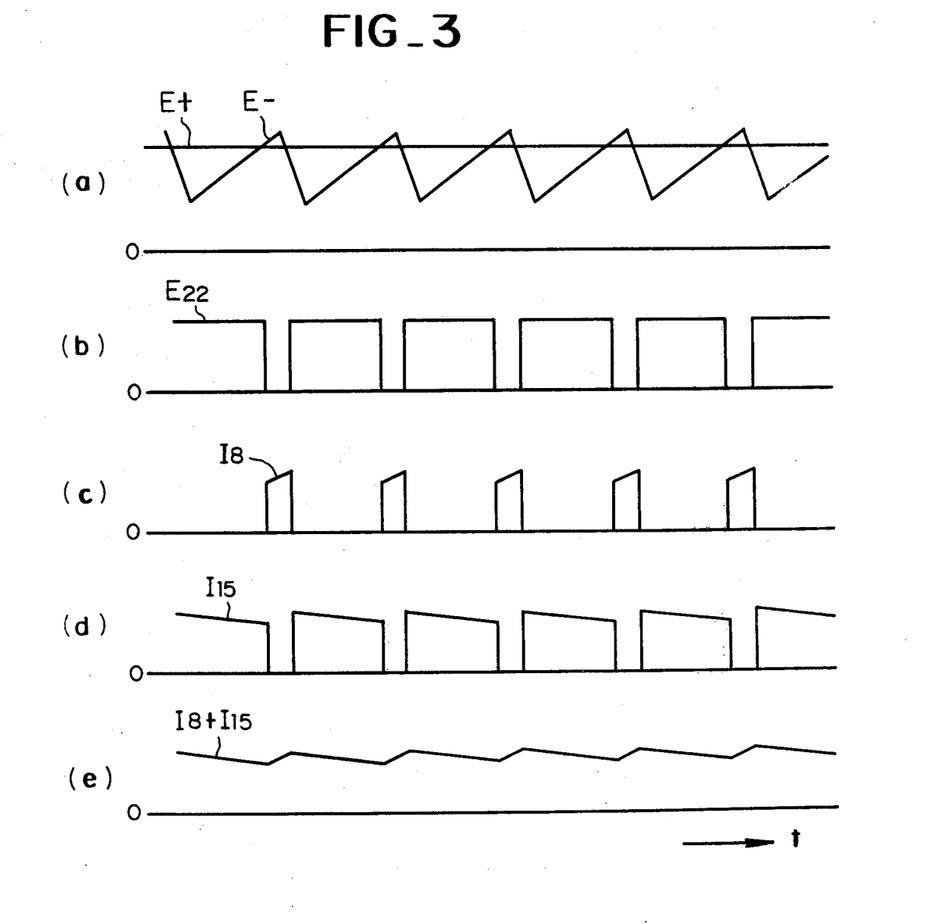
FIGS. 3-5 are the wave form diagrams of voltage and current at each component unit for explanation of the operation of the said circuit.

The pulse motor driving circuit of this invention is in such a construction as described above. When a needle of a sewing machine is in a sewn cloth, the pulse motor is stopped while keeping a balance with a constant current applied. The operation of the pulse motor driving circuit under this state; that is, a static state is explained in the following FIG. 3 shows the waveforms of voltage or current at the component parts of the pulse motor driving circuit under the said static state. When FIG. 3 is referenced with FIGS. 1 and 2, the lateral axes of (a) through (e) in FIG. 3 indicate common time (t) axes, and the level (0) means an earthing level common to each of them or zero current. However, this is based on the assumption that the transistors (3) and (8) are actuated by a driving signal input (18) and a constant current (pulsating current in the case as described later) is flowing through the winding (1). (E−) in FIG. 3 (a) is an input voltage waveform at the inversion input terminal (−) is a triangular waveform of a certain chape. Similarly, (E+) is an input voltage waveform at the non-inversion input terminal (+). In this case, the terminal is receiving the voltage of the resistor (12) on the basis of the winding current. As shown in the diagram, the triangular waveform voltage (E−) has a duration longer than for voltage (E+) for every generation thereof. FIG. 3 (e) indicates the output voltage $(E_{22})$ of the comparator $(CO_1)$, which is a rectangular wave that is zero voltage for the duration longer than that of the said voltage (E+). Driving input signal (18) actuates the transistor (3) and also actuates the transistor (22) during the period when the said voltage $(E_{22})$ is zero, and at the same time it actuates the transistor (8) to allow the current of the winding (1) to flow through the transistor (8), diode $(D_8)$, winding (1), diode $(D_3)$, transistor (3) and resistor (12) in that order. FIG. 3 (c) indicates the current $(I_8)$ flowing through the transistor (8) at this time, and inclination of this current is based on the inductance of supply voltage (11) as well as winding (1) and the winding resistance and the resistor (12). FIG. 3 (d) indicates current $(I_{15})$ flowing through the diode $(D_3)$, transistor (3), resistor (12), and diode (15) by the electromagnetic energy accumulated in the winding (1) in the period when the current $(I_8)$ is 0, and its current inclination is based on the said accumulated electromagnetic energy, the inductance and the resistance. FIG. 3(e) shows the integrated current $(I_8+I_{15})$ of the winding (1), which is a pulsating current flowing through the resistor (12). This current, by way of the said low-pass filter, makes the voltage (E+) shown in FIG. 3 (a) constant.

Figure 4:
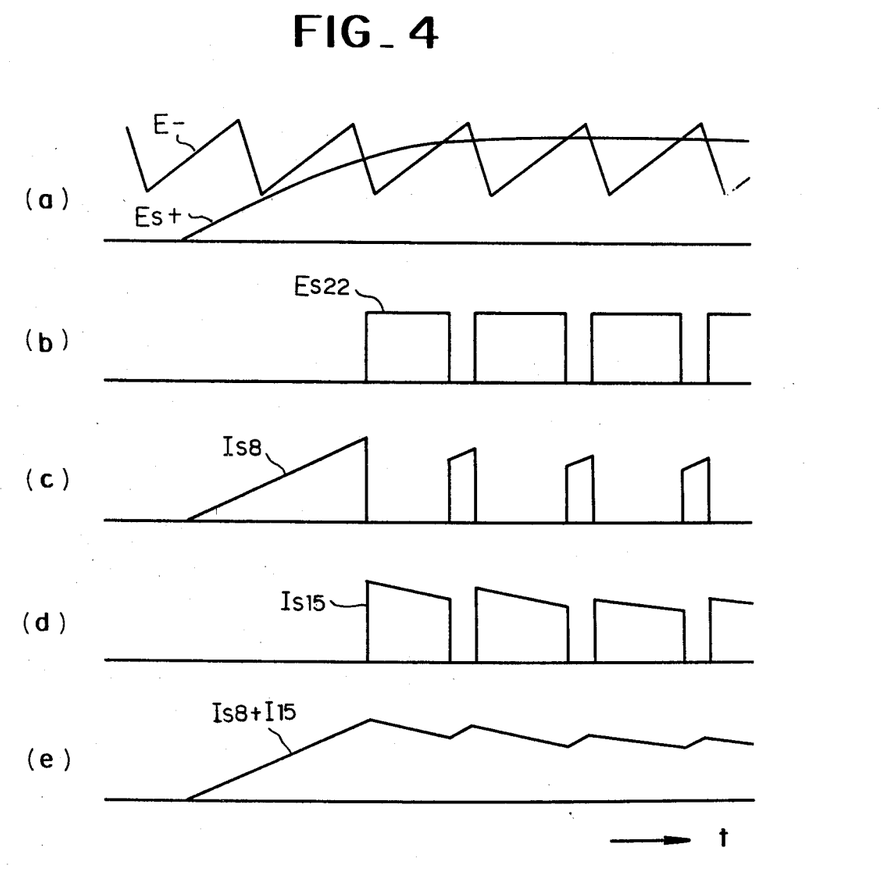

In the next place, the operation of the driving circuit at time the pulse motor is started is explained. If, for instance, the driving input signal (18) is applied when the current at the winding (1) is zero, non-inversion input voltage (Est) of the comparator $(CO_1)$ is below the non-inversion input voltage (E−) at the initial stage as shown in FIG. 4(a), while as the output from the said comparator $(E_{s22})$ is zero at the initial stage, the transistors (22) and (8) are actuated to increase the current $(I_{s8})$ flowing through the transistor (8).

Figure 5:
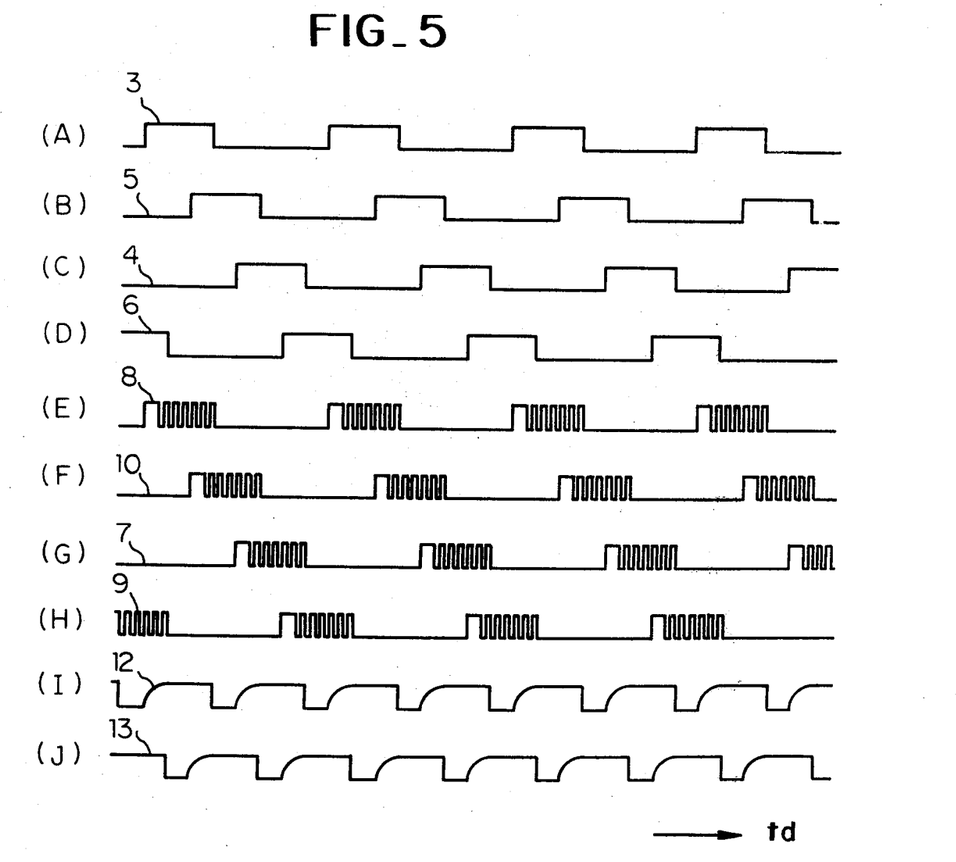

FIG. 5 illustrates the state of conduction or voltage waveform at the component units when the windings (1) and (2) are sequentially excited and deexcited including inversion of the direction of current, thus running the pulse motor. The lateral axes show the common time (td) axes. (A), (B), (C) and (D) in the diagram represent conduction cycles of the transistors (3), (5), (4) and (6), respectively. Current circulates at the phase difference obtained by the four equal divisions of the cycle by each of the said transistors as shown in the diagrams. The operation of these transistors (3), (4), (5) and (6) including their operating sequence is based on the driving input signals (18), (19), (20) and (21). (E), (F), (G) and (H) indicate conduction cycles of the transistors (8), (10), (7) and (9), respectively, and the fine repeating conduction durations and their timings are in accord with (A), (B), (C) and (D) respectively, and the fine repeating conduction cycles are in accord with (c) in FIGS. 3 and 4. In other words, the first conduction duration is long as shown in FIG. 4 (c). (I) and (J) are voltage waveforms of the resistors (12) and (13), respectively. For instance, the first conduction duration of (I) is a duration in which the transistors (8) and (3) are conducted or repeating conductions on the basis of the current flowing from the right to the left of the winding (1) in FIG. 2. Similarly, the subsequent conduction duration is on the basis of the current flowing from the left to the right of the winding (1) as the result of the conduction of the transistors (7) and (4). This voltage waveform represents approximate value and is in accord with (e) in FIGS. 3 and 4. A combination of the direction of current of the windings (1) and (2) and excitation and deexcitation sequence decides the direction of rotation of the pulse motor. In other words, to run the pulse motor in the reverse direction, it can be accomplished by combining the sequences of actuation of the transistors (6), (4), (5) and (3) with those of (9), (7), (10) and (8). From (I) and (J) in the diagram it can be seen that the windings (1) and (2) could be independently and also, simultaneously excited.

Figure 6:
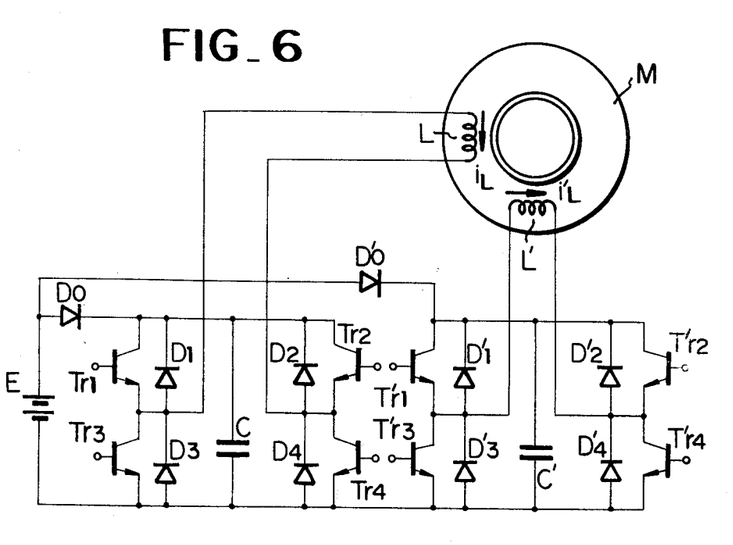
FIG. 6 is the circuit diagram for the second example of the driving device of this invention.

FIG. 6 is a circuit diagram for the second example of the pulse motor driving device of this invention. (M) indicates the pulse motor, (L) and (L') are the windings of the pulse motor. The motor is so designed that when these windings are excited, orthogonal magnetic fields are generated, and the direction of rotation of the pulse motor is controlled through control of the direction of current of these windings, control of their combination or combination of independent excitation of these windings. (E) is a DC power supply for driving the pulse motor, and $(Tr_1)$, $(Tr_2)$, $(Tr_3)$ and $(Tr_4)$ are the switching transistors of the winding L. (Further, element symbols without dash (') mark are for the winding (L), element symbols with dash (') mark are for the winding (L'), and the same symbol with or without (') mark represent the same sort of elements, and the description of another element will be omitted in the subsequent explanation). The transistors $(Tr_1)$ and $(Tr_3)$, and $(Tr_2)$ and $(Tr_4)$ are arranged in a cascade connection, the collectors of $(Tr_1)$ and $(Tr_2)$ are connected to + side of the power supply (E) by way of the diode $(D_0)$, the emitters of $(Tr_3)$ and $(Tr_4)$ are connected to − side of the same, the cascade connection points of the transistors are connected to the winding (L) as shown, and between the collectors and emitters the diodes $(D_1)$-$(D_4)$ are so connected that the current flows in the reverse direction of collector current. Although connection of the bases of these transistors are omitted in the diagram, these bases are connected to the control unit which controls the current of the winding (L) through a chopper control system by selectively actuating a pair of the transistors $(Tr_1)$ and $(Tr_4)$, and $(Tr_2)$ and $(Tr_3)$. (C) is a capacitor which is connected to the power supply (E) by way of the said diode $(D_0)$. When either one of the pairs of the transistors $(Tr_1)$ and $(Tr_4)$ or $(Tr_2)$ and $(Tr_3)$ is actuated and current is flowing through the winding (L), the capacitor (C) is charged with the voltage (E), and when the said current is interrupted, the capacitor is charged with the induced voltage $(l_L)$ of the winding (L), which is extremely higher than voltage (E), by way of the diodes $(D_1)$ through $(D_4)$. Current of the winding (L) at the initial stage of the subsequent operation of the paired transistors is determined on the basis of the charging voltage according to the induced voltage.

Figure 7:
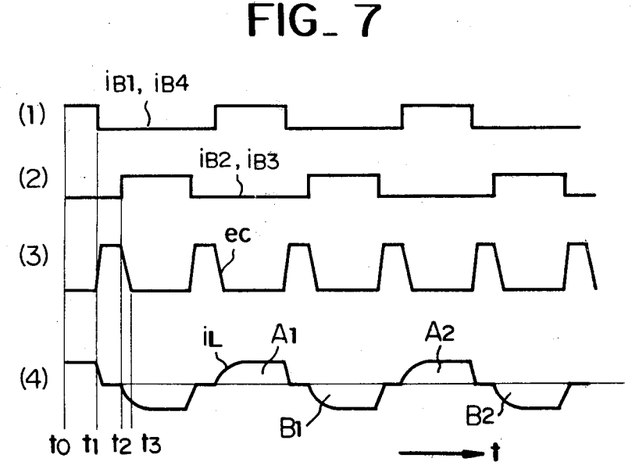
FIG. 7 is the voltage and current waveform diagram of each component unit.
Figure 8:
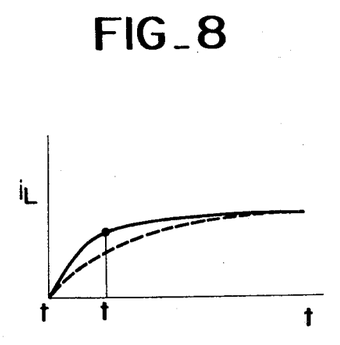
FIG. 8 is the detailed diagram of exciting current of the pulse motor.

The second example of the pulse motor driving circuit of this invention is in a construction as described above. The operation of this circuit is explained in detail in the following with reference to FIG. 7, which shows the voltage and current at component units. (1) and (2) are base current $(i_{B1})$ and $(i_{B4})$, and $(i_{B2})$ and $(i_{B3})$ for switching the paired transistors $(Tr_1)$ and $(Tr_4)$, and $(Tr_2)$ and $(Tr_3)$. The transistors which are paired against the common time axis (t) as shown in the diagram have the same phase, and are so controlled by the control unit, which is not shown in the diagram, that the paired transistors will not simultaneously actuated. For example, if the transistors $(Tr_1)$ and $(Tr_4)$ are actuated by the base currents $(i_{B1})$ and $(i_{B4})$ at Time (to) and the current $(i_L)$ in the direction of the arrow mark shown in FIG. 6 is flowing as shown in FIG. 7, the capacitor (C) is charged by the power supply (E) by way of the diode $(D_0)$. Then, when the transistors $(Tr_1)$ and $(Tr_4)$ are de-energized at Time (t1) to interrupt the current $(i_L)$, a high voltage in the direction of the arrow mark is induced to the winding (2) by the current interruption inclination $(di_L/dt)$ and inductance of the said winding, and the capacitor is charged by way of the diodes $(D_2)$ and $(D_3)$ with a certain inclination as shown by (3) in FIG. 7, and the capacitor voltage (ec) is thus increased. Further, when the induced voltage of the winding (2) that drops during this charging duration comes to accord with the charging voltage, the charging is completed. Then, when the transistors $(Tr_2)$ and $(Tr_3)$ are activated at Time (t2), the winding (2) is excited in the reverse direction of arrow shown in the diagram. With the said charging voltage extremely higher than the voltage (E) used as a power supply. FIG. 8 shows the details of build-up of the current $(i_L)$ and the current is shown in the reverse direction of that shown in FIG. 7 for convenience.

The chain line in FIG. 8 represents the build-up of the winding current at time the winding (L) is excited by the supply voltage (E), and the solid line indicates the sharp build-up of the charging voltage of the condenser (C) as it is higher than the supply voltage (E) at time the transistors $(Tr_2)$ and $(Tr_3)$ are activated. When Time (t3) is reached, the charging voltage comes to accord with the supply voltage (E) and the exciting current is subsequently supplied from the said power supply; that is, the inclination is shifted to that of the exciting current from the power supply (E) at Time (t3) at a point of refraction.

The upper half areas $(A_1)$ and $(A_2)$ encircled by the current $(i_L)$ shown in (4) of FIG. 7 indicate the magnetomotive force when the winding (L) is excited in the direction of arrow shown in FIG. 6. Similarly, the lower half areas $(B_1)$ and $(B_2)$ indicate the magnetomotive force in the reverse direction of the arrow. Accordingly, the solid line rather than the chain line shown in FIG. 8 indicates a larger magnetomotive force.

Figure 9:
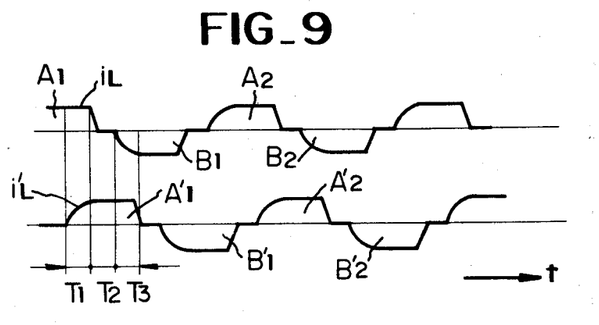
FIG. 9 is the phase relation diagram of the said pulse motor.
Figure 10:
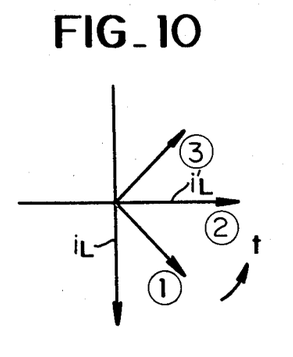
FIG. 10 is the diagram showing a secular change of combined electromotive force of the said pulse motor.

FIG. 9 shows a relation of phases of currents ($i_L$) and ($i_L'$) of the windings (L) and (L'). At time (T1) a combined magnetomotive force is generated by the exciting currents ($i_L$) and ($i_L'$) in the direction of arrow, and as the result, for instance, the magnetomotive force can be expressed by the arrow (i) as shown in FIG. 10, and at Time (T2), no ($i_L$) current is flowing but only current ($i_L'$) is flowing and therefore, the magnetomotive force becomes in the direction of arrow (2). Similarly, at Time (T3) the magnetomotive force of the current ($i_L$) is in the reverse direction as indicated by the arrow (3). Subsequently, the direction of magnetomotive force is rotated in the same manner and the pulse motor is thus rotated.

Figure 11:
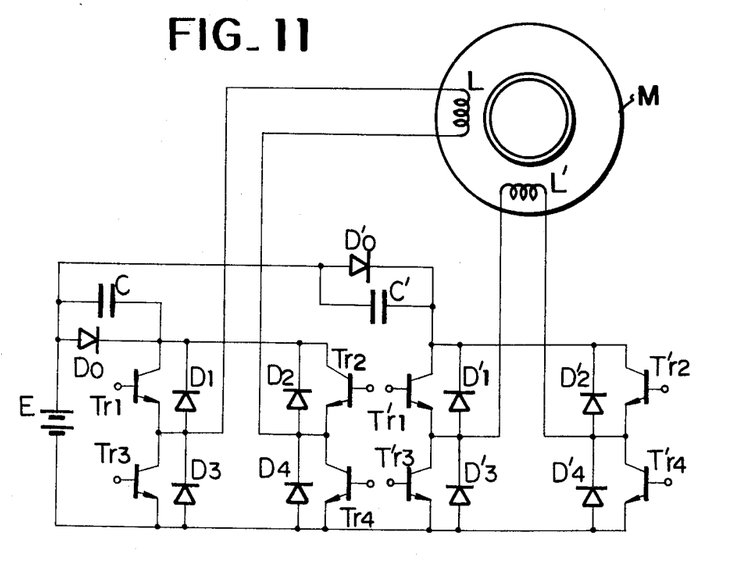
FIG. 11 is the circuit diagram of the third example of the driving device of this invention.

Further, the capacitor (C) and (C') may be connected in parallel with the diodes (Do) and (Do') as shown in FIG. 11, which is the third example of this invention, instead of the connection shown in FIG. 6 of the second embodiment. In this case, charging and discharging are carried out through the power supply (E), but the explanation is omitted.

According to this invention as described in detail in the foregoing, a voltage is applied to the pulse motor intermittently and the trailability of movement of a needle or cloth feeding action is improved at the time the sewing machine is operated at high speed through utilization of the smoothing effect by means of inductance of the pulse motor windings, and erroneous operation is eliminated. When taking a four-phase motor as an example, at least half of the pulse motor windings are excited to improve the utilization factor of the windings for excitation, thus reducing the copper loss of the pulse motor, and a circuit can be constructed in compact by using semiconductors without causing the unnecessary power loss, thus allowing easy housing of the driving device in a narrow space available in a sewing machine. Furthermore, the capacitors keep the electromagnetic force at the time the winding current is interrupted, and as the charging current at that time flows through the diodes, the winding current is rapidly interrupt while the transistors are protected from the induced voltage of the windings. At the time of the subsequent excitation of the windings, the charged energy is supplied to the windings to improve the build-up of the winding current and to bring the winding current waveform close to rectangular waveform. Therefore, waveforms of the currents ($i_L$) and ($i_L'$) in FIG. 9 do not overlap unnecessarily each other at the times (T1), (T2) and (T3), and the switching response of magnetomotive forces (1), (2), (3) . . . are further improved, thus allowing highly efficient high-speed operation of the pulse motor. As stated above, this invention has excellent industrial as well as practical effects.

We claim:

1. A pulse motor driving device for a pulse motor having a plurality of windings each connected to a driving power source comprising detecting means for detecting a value of electric current flowing through the windings; reference voltage generating means producing a triangular wave signal of a predetermined period; comparator means comparing the detected value of electric current of the windings and the triangular wave signal, said comparator means producing a chopping signal providing a period for applying the voltage of the driving power source to the windings each time the level of the triangular wave signal becomes higher than that of the electric current of the windings; bridge circuits each composed of four switching elements for each of the windings, said bridge circuits being each connected to the driving power source through said detecting means at a point thereof between the joints of the adjacent switching elements on one diagonal of the bridge circuit, and each having the winding connected between the joints of the adjacent switching elements on the other diagonal of the bridge circuit; switching element control means for controlling the switching operation of the opposite switching elements in each of the bridge circuits, said switching element control means selectively applying a driving pulse signal to one of the opposite switching elements in each bridge circuit, which is connected to the respective detecting means to continuously make the switching element on and off, and selectively controlling the switching operation of the other of the switching elements in each bridge circuit in accordance with the chopping signal of the comparator means so as to supply the voltage of the driving power source to the switching element while the switching element is on due to the chopping signal; and diodes connected between one pole of the driving power source and both ends of the windings respectively, said diodes forming a short-circuit in which the electromagnetic energy of the windings may flow through said detecting means and said ones switching elements connected to the detecting means while the current flow from the driving power source to said others switching elements is blocked by the chopping signal.

* * * * *